April 13, 1926.
J. E. HOWORTH
1,580,300
COMBINED COOLER AND FILTER
Filed July 13, 1925
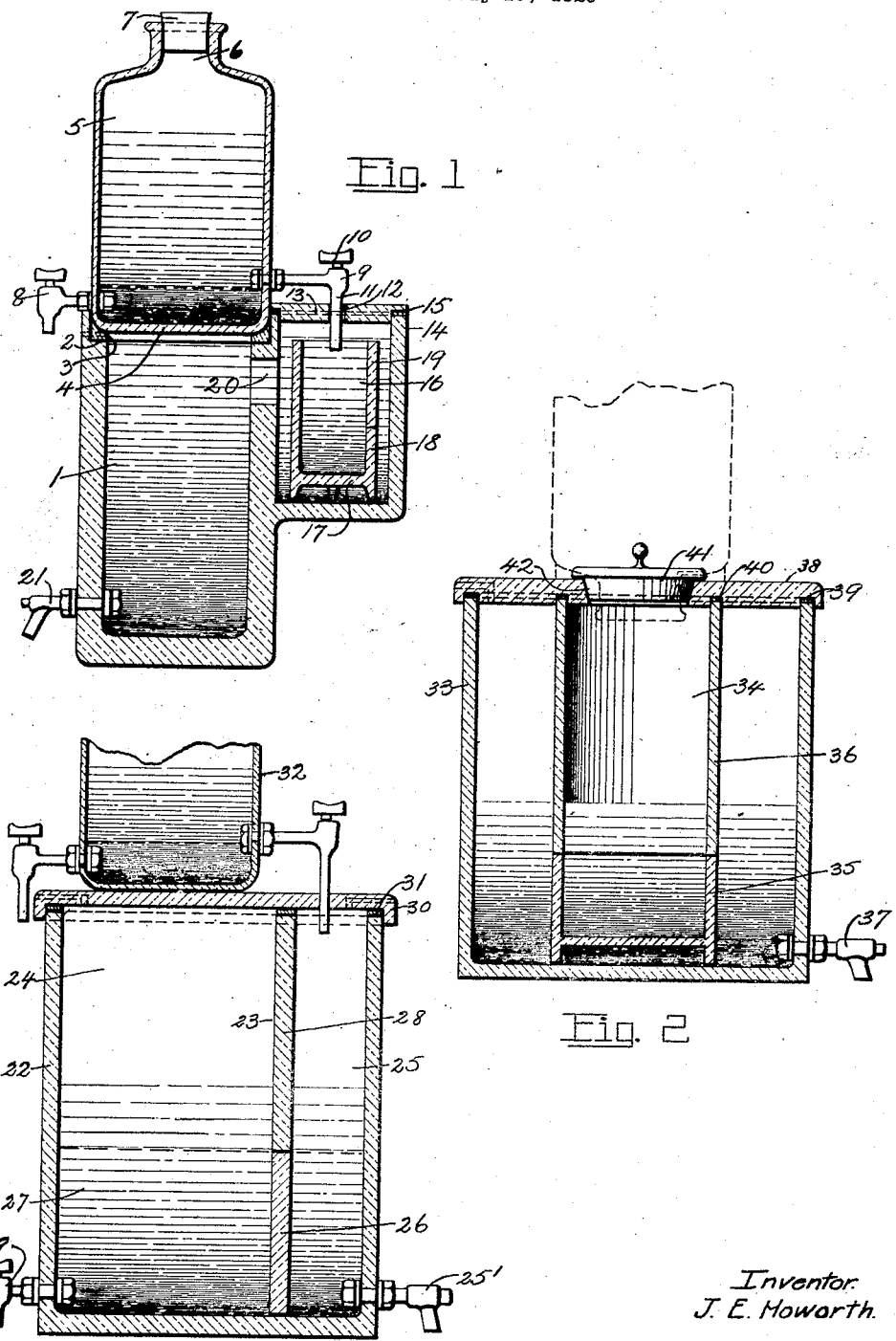
Inventor.
J. E. Howorth.
by Joseph Dugan
ATTORNEY.

Patented Apr. 13, 1926.

1,580,300

UNITED STATES PATENT OFFICE.

JAMES E. HOWORTH, OF VENICE, CALIFORNIA.

COMBINED COOLER AND FILTER.

Application filed July 13, 1925. Serial No. 43,244.

*To all whom it may concern:*

Be it known that I, JAMES E. HOWORTH, a citizen of the United States, residing at Venice, in the county of Los Angeles, State of California, have invented new and useful Improvements in Combined Coolers and Filters, of which the following is a specification.

My invention relates to combination water filters and coolers in which the cooling is effected by evaporation of the water being filtered, and the filtering is effected by passing any ordinary impure or service water through a filtering stone which forms a very efficient filtering medium.

The object of my invention is to provide a combined water cooler and filter with the parts thereof arranged and constructed to form settling basins in which the heavy impurities or sludge of the water to be filtered may be allowed to settle before passage of the water through the filtering stone and from which the sludge or impurities may be readily removed during the cleaning of the instrument.

A further object of the invention is to construct the parts of the combined filter and cooler and arrange them so that all parts of the apparatus may be readily accessible for the purposes of cleaning and repair.

A still further object of my invention is to provide a combined water filter and cooler which will be extremely simple in construction, cheap to manufacture, and highly efficient in use.

In the accompanying drawing, forming a part of this specification, and wherein like numerals of reference designate like parts throughout the several views:—

Figure 1 is a central vertical section through one form of my invention, in which the cooler part of my device is adapted to support and be closed by a container or bottle for the water to be filtered;

Figure 2 is a central vertical section through the simplest form of my invention; and Figure 3 is a central section through another modification of the invention.

In Figure 1, the reference numeral 1 designates a cylindrical cooling receptacle for filtered water, formed of porous earthenware or other suitable porous material through which water may percolate to be evaporated by contact with the outside air and thereby cool the water remaining in the receptacle in the manner well known in the art.

The open end of the cooling receptacle 1 is provided with a shoulder 2 to form a seat for an annular vented gasket of rubber or other suitable material shaped to receive and make an airtight connection with the bottom 4 of the container 5 for the water to be filtered and cooled. The container 5 has its neck opening sealed with a plug or cork 7 and is provided with a drain cock 8, arranged as closely as possible to the bottom 4 to drain the heavy impurities or sludge which may settle adjacent the bottom.

Suitably fixed to the container 5, and at any convenient distance above the bottom 4 thereof sufficient to form a settling basin, is a faucet 9 controlled by a plug 10. The faucet 9 has a branch 11 extending through an aperture 12 in a cover 13 adapted to seat on and close the top of a cooling and filtering chamber 14, a gasket 15 being provided to make an airtight connection between said cover and chamber.

The chamber 14 is constructed of the same porous material as the cooling receptacle 1, and may be moulded integral therewith as shown or in any other desired manner. Within the chamber 14, a filtering vessel 16 is positioned so that its upper open end extends above the bottom of the branch 11 of the faucet 9, in order to form the usual water trap. This vessel 16 has its bottom 17 and the lower part 18 thereof, extending upward approximately one-third of the height of the vessel, made of non-porous heavily glazed material, to form a second settling basin. The remaining upper part 19 of this filtering vessel is made of porous filtering stone through which water percolates and is filtered by this percolation, into the cooling chamber 14, from which it passes through an aperture 20 into the main cooling and dispensing receptacle 1. A spring operated plunger faucet 21 is fixed in any desired manner to the side of and near the bottom of the receptacle 1 to draw off the cool filtered water as desired.

The settling basins are the most important features of my invention, and the parts of my apparatus are so constructed that these basins may be readily drained and cleaned. Obviously, the whole container 5 may be readily cleansed by closing the faucet 10 and flushing out the container through the neck 6 and opened drain cock 8, and the filtering vessel can be readily removed and cleaned as desired.

In the modification shown in Figure 3, the cooling dispensing receptacle 22, formed of the same porous material as receptacle 1, is divided by a partition 23 into a chamber 24, adapted to receive water to be filtered, and a chamber 25 from which filtered water may be drawn through the faucet 25', as desired.

The partition 23 has a lower non-porous heavily glazed part 26, suitably cemented to the bottom and sides of the receptacle 22 to form a settling basin 27, and an upper part 28 made of porous filtering stone cemented to the lower part 26 and to the sides of the receptacle 22. A drain cock 29 serves the same purpose as drain cock 8 to clean out the settling basin 27 and to facilitate flushing of the chamber 24.

A vented cover 30 serves to close the open end of receptacle 22, and a gasket 31 makes the connection between the cover and receptacle airtight.

Of course, either of the chambers 24 or 25 may be used as a filtering chamber, and the cover may serve to support a bottle 32 similar in every respect, and similarly equipped with drain cock and faucet, to the bottle shown in Figure 1. Where the bottle is used, it would be preferable to employ the smaller chamber 25 to receive the water to be filtered, while the chamber 24 would then be used as a holder for the filtered water.

In the modification shown in Figure 2, the porous cooling receptacle 33, which may be of any desired shape, is provided with a removable cylindrical filtering vessel 34, the lower part 35 of which is non-porous and glazed to form a settling basin, while the upper part 36 is formed of the usual porous filtering stone. A dispensing faucet 37 is fixed to the receptacle 33 near the bottom thereof to serve, when desired, as a draw off for the cooled filtered water in the receptacle 33.

A vented cover 38, provided with a groove 39 adapted to receive the top of receptacle 33, has also a groove 40 adapted to receive and position the top of vessel 34, and, incidentally, to position the vessel 34 itself in the receptacle 33. A closer 41 serves to close the aperture 42 in the cover 38 communicating with the interior of the filtering vessel 34, and this aperture 42 is so shaped that a bottle of the type usual in the water cooling art may be inverted and seated therein to feed the filter in the well known manner.

In this modification the filtering vessel can, obviously, be readily removed and cleaned, and the cooling vessel itself can be readily cleansed and flushed out.

Having thus described my invention, what I claim as new, and desire to secure by Letters Patent, is:—

1. A porous liquid-cooling vessel having a filtering partition therein dividing said vessel into two chambers and having the lower part thereof impervious to liquids to form a settling basin in one of said chambers.

2. A porous liquid-cooling vessel, a filtering partition dividing said vesssel into two chambers, said partition having its lower part glazed and non-porous to form a settling basin in one of said chambers, and having its upper part porous to filter liquid from said chamber into the other chamber.

3. A porous liquid-cooling vessel, a filtering partition therein and having it lower part glazed to form a settling basin in said vessel, and means in said vessel to draw filtered water therefrom.

4. A porous liquid-cooling vessel, a container for liquids mounted thereon, a filtering partition in said vessel dividing the latter into two chambers, and means for conducting liquid from said container into one of said chambers and connected to said container to form a settling basin therein.

5. A porous liquid-cooling vessel, a container for liquids mounted thereon, means for dividing said vessel into two chambers and to form a settling basin in one of them, means for conducting liquid from the container into the chamber having the settling basin and connected to said container to form a settling basin therein, and means to drain off the settling basin in said container.

6. A porous liquid-cooling vessel, filtering means dividing said vessel into two chambers and provided at its lower part with means to form a liquid impervious settling basin in one of said chambers, and means to draw off liquid from the other chamber.

7. The combination with the apparatus set forth in claim 5, of means for withdrawing liquid from the second chamber.

8. The combination set forth in claim 1, in which said partition is cylindrical.

9. A porous liquid-cooling vessel, a cylindrical filtering partition therein having its lower part glazed to form a settling basin, and means in said vessel to draw filtered water therefrom.

In testimony whereof, I have signed my name to this specification.

JAMES E. HOWORTH.